(12) United States Patent
Machnicki et al.

(10) Patent No.: US 9,152,210 B2
(45) Date of Patent: Oct. 6, 2015

(54) METHOD AND APPARATUS FOR DETERMINING TUNABLE PARAMETERS TO USE IN POWER AND PERFORMANCE MANAGEMENT

(71) Applicant: Apple Inc., Cupertino, CA (US)

(72) Inventors: Erik P Machnicki, San Jose, CA (US);
Brian P Lilly, San Francisco, CA (US);
Gurjeet S Saund, Saratoga, CA (US);
Sukalpa Biswas, Fremont, CA (US)

(73) Assignee: Apple Inc., Cupertino, CA (US)

( * ) Notice: Subject to any disclaimer, the term of this patent is extended or adjusted under 35 U.S.C. 154(b) by 318 days.

(21) Appl. No.: 13/767,897

(22) Filed: Feb. 15, 2013

(65) Prior Publication Data

US 2014/0237276 A1 Aug. 21, 2014

(51) Int. Cl.
*G06F 1/32* (2006.01)
(52) U.S. Cl.
CPC .................................. *G06F 1/3234* (2013.01)
(58) Field of Classification Search
CPC ............................. G06F 1/3287; G06F 1/3234
USPC ........................................................ 713/323
See application file for complete search history.

(56) References Cited

U.S. PATENT DOCUMENTS

| 5,864,702 | A | 1/1999 | Walsh et al. |
| 7,206,948 | B2 | 4/2007 | Brauer |
| 2004/0151304 | A1 | 8/2004 | George et al. |
| 2009/0259861 | A1* | 10/2009 | Tune ............................. 713/320 |
| 2012/0167118 | A1 | 6/2012 | Pingili et al. |

* cited by examiner

*Primary Examiner* — Albert Wang
(74) *Attorney, Agent, or Firm* — Meyertons, Hood, Kivlin, Kowert & Goetzel, P.C.; Erik A. Heter

(57) ABSTRACT

Various method and apparatus embodiments for selecting tunable operating parameters in an integrated circuit (IC) are disclosed. In one embodiment, an IC includes a number of various functional blocks each having a local management circuit. The IC also includes a global management unit coupled to each of the functional blocks having a local management circuit. The management unit is configured to determine the operational state of the IC based on the respective operating states of each of the functional blocks. Responsive to determining the operational state of the IC, the management unit may provide indications of the same to the local management circuit of each of the functional blocks. The local management circuit for each of the functional blocks may select one or more tunable parameters based on the operational state determined by the management unit.

24 Claims, 5 Drawing Sheets

METHOD AND APPARATUS FOR DETERMINING TUNABLE PARAMETERS TO USE IN POWER AND PERFORMANCE MANAGEMENT

BACKGROUND

1. Technical Field

This disclosure is directed to integrated circuits, and more particularly, to determine parameters for power and performance management in integrated circuits.

2. Description of the Related Art

In recent years, power management has become an increasingly important factor in the design of integrated circuits (ICs), in part due to increasing levels of integration on a single IC die. The advent of the mobile/portable electronic devices (e.g., smart phones, tablets, etc.) has further driven the demand for more power efficient ICs in order to preserve the battery life of such devices.

Responsive to the demand for more efficient power management on ICs, numerous schemes have been developed. In many ICs, various functional units implemented thereon may be clock gated or power gated. Clock gating may be defined as inhibiting a clock signal from being provided to a functional unit when that unit is idle. Similarly, power gating may be defined as inhibiting power from being provided to a functional unit when it is idle.

Although power management is an important factor in the design of ICs, obtaining optimal performance is another important factor. In many IC designs, there is a tradeoff that exists between power savings and performance. Some IC designs may emphasize higher performance at the expense of greater power consumption. Other IC designs may emphasize reduced power consumption, at the expense of performance.

SUMMARY

Various method and apparatus embodiments for selecting tunable operating parameters in an integrated circuit (IC) are disclosed. In one embodiment, an IC includes a number of various functional blocks each having a local management circuit. The IC also includes a global management unit coupled to each of the functional blocks having a local management circuit. The management unit is configured to determine the operational state of the IC based on the respective operating states of each of the functional blocks. Responsive to determining the operational state of the IC, the management unit may provide indications of the same to the local management circuit of each of the functional blocks. The local management circuit for each of the functional blocks may select one or more tunable parameters based on the operational state determined by the management unit.

In one embodiment, a method includes a management unit of an IC (e.g., a power management unit) monitoring local operating states for each of a number of functional units of the IC. The local operating states may be indicative of workloads, operating points (e.g., current operating voltage and clock frequency) and so on. The method further includes the management unit determining a global operating state of the IC based on an aggregate of some or all the local operating states. Information regarding the global operating state may be provided to local management units in each functional block that includes one. Based on the information regarding the global operating state, the local management unit of each of the functional block may select one or more tunable parameters. Tunable parameters selected may include timeout periods, operating clock frequencies, operating voltages, and virtually any other parameter that may be adjustable during operation of the IC.

BRIEF DESCRIPTION OF THE DRAWINGS

The following detailed description makes reference to the accompanying drawings, which are now briefly described.

Figure 1:
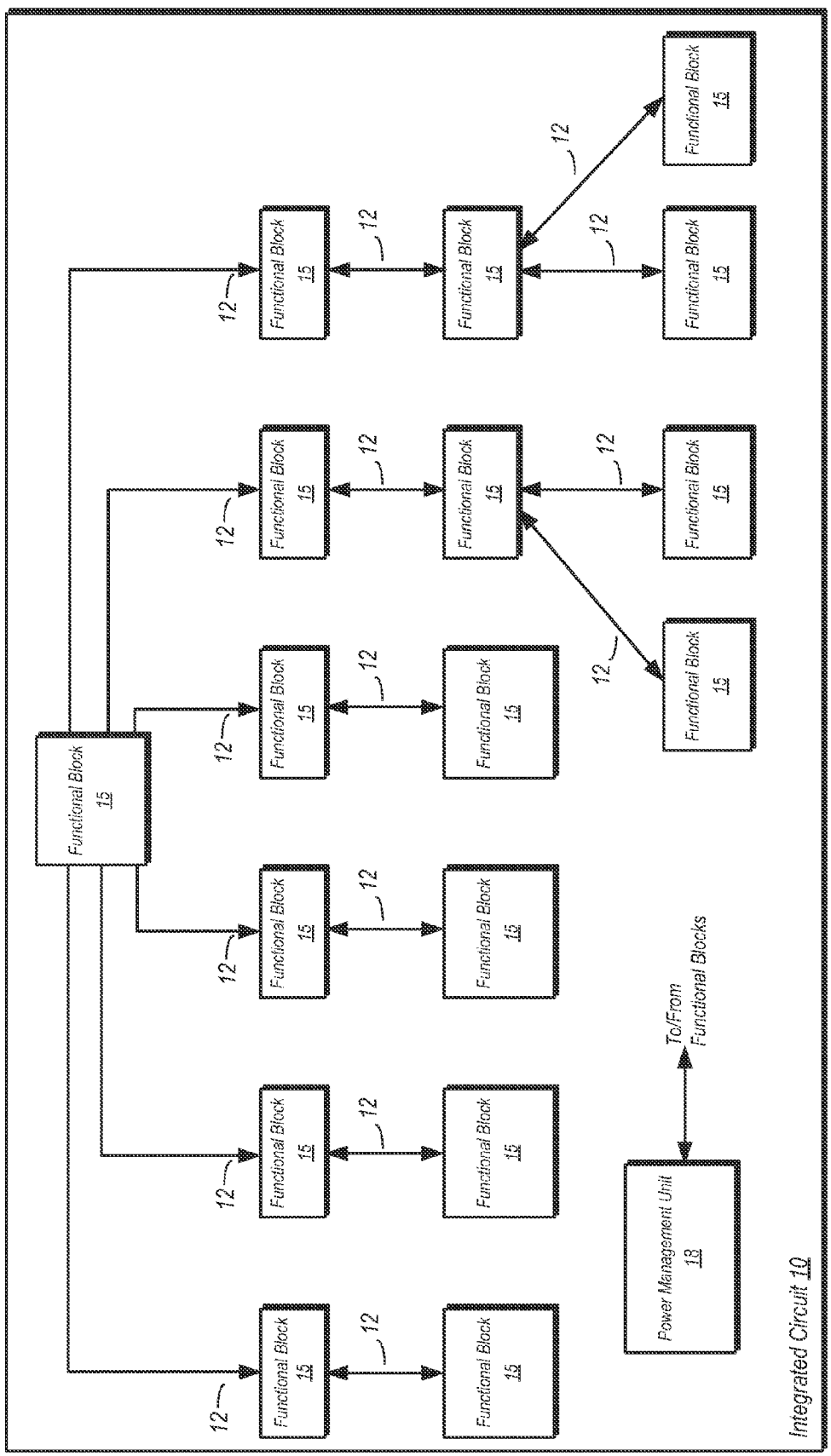
FIG. 1 is a block diagram of one embodiment of an integrated circuit (IC).

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Turning now to FIG. 1, a block diagram of one embodiment of an integrated circuit (IC) is shown. In the embodiment shown, IC 10 includes a number of functional blocks 15. Each of the functional blocks 15 may be one of a number of different types of functional units, and may provide different functionality from at least some of the other functional blocks 15. For example, a number of processor cores, one or more graphics processors, one or more input/output (I/O) interfaces, and a memory controller may be included among the various instances of the functional blocks 15 shown in FIG. 1. The arrangement of IC 10 as shown herein is representative of one particular embodiment, although the various method and apparatus embodiments discussed below may be applied to a wide variety of ICs in various configurations and arrangements.

Each of the functional blocks 15 in the embodiment shown is coupled to at least one other functional block 15 by a communications link 12. In the embodiment shown, each communications link 12 is a point-to-point communications link, supporting communications between the pair of functional blocks 15 to which it is coupled. Moreover, each of the communications links 12 may support two-way communications between the two functional blocks 15 to which it is coupled. Functional blocks 15 that are coupled to one another by a given communications link 12 may be said to be logically adjacent to one another for the purposes of this disclosure. Thus, functional blocks 15 as shown in FIG. 1 may communicate directly with other functional blocks 15 that are logically adjacent thereto. For communications between two functional blocks 15 that are not logically adjacent to one another, communications may be routed through one or more intervening functional units.

It is noted that communications links implemented as shared buses are also possible and contemplated, and such buses may support implementation of various features discussed below.

IC 10 in the embodiment shown also includes a power management unit 18, which is coupled to at least some, if not all, of functional blocks 15. Power management unit 18 may perform various actions to control the consumption of power by IC 10. Such functions include causing the clock gating of idle functional blocks and causing power gating of idle functional blocks. Clock gating may be defined herein as inhibiting a clock signal from being provided to circuitry internal to a functional block. Power gating may be defined herein as inhibiting power from being provided to circuitry internal to a functional block. Power management unit 18 may thus cause a functional block 15 coupled thereto to enter a low power state, wherein a low power state may be defined herein as the functional block being clock gated, power gated, or both. An active state may be defined herein as a state in which a given functional block 15 is receiving both power and a clock signal, irrespective of whether it is actually performing useful work at that time. A functional block 15 may be defined as being in an idle state when it is not performing useful work and has not for some time, even though it is otherwise receiving both power and a clock signal.

It is noted that (and is discussed in more detail below) that at least some of the power-manageable functional blocks 15 may include some portions of circuitry that may in some cases remain powered on and operational when the functional block 15 is otherwise power-gated and/or clock gated. Such circuitry may locally perform certain power management functions, and some of these functions may be performed under the direction of power management unit 18. As is discussed below, at least some of the functional blocks 15 include local power managers which may locally perform clock gating and power gating under the direction of power management unit 18. Furthermore, the local power managers of such functional blocks 15 may set other tunable parameters as well, as is also discussed below. In general, power management unit 18 may in various embodiments be considered as a performance manager circuit which may determine various performance states of IC 10 based on the performance states of individual ones of functional blocks 15. Moreover, the local power managers of those functional blocks 15 that are so configured may be more generally referred to as performance management circuits, and may locally select and set various tunable parameters based on global state information received from a global performance manager circuit such as power management unit 18.

Figure 2:
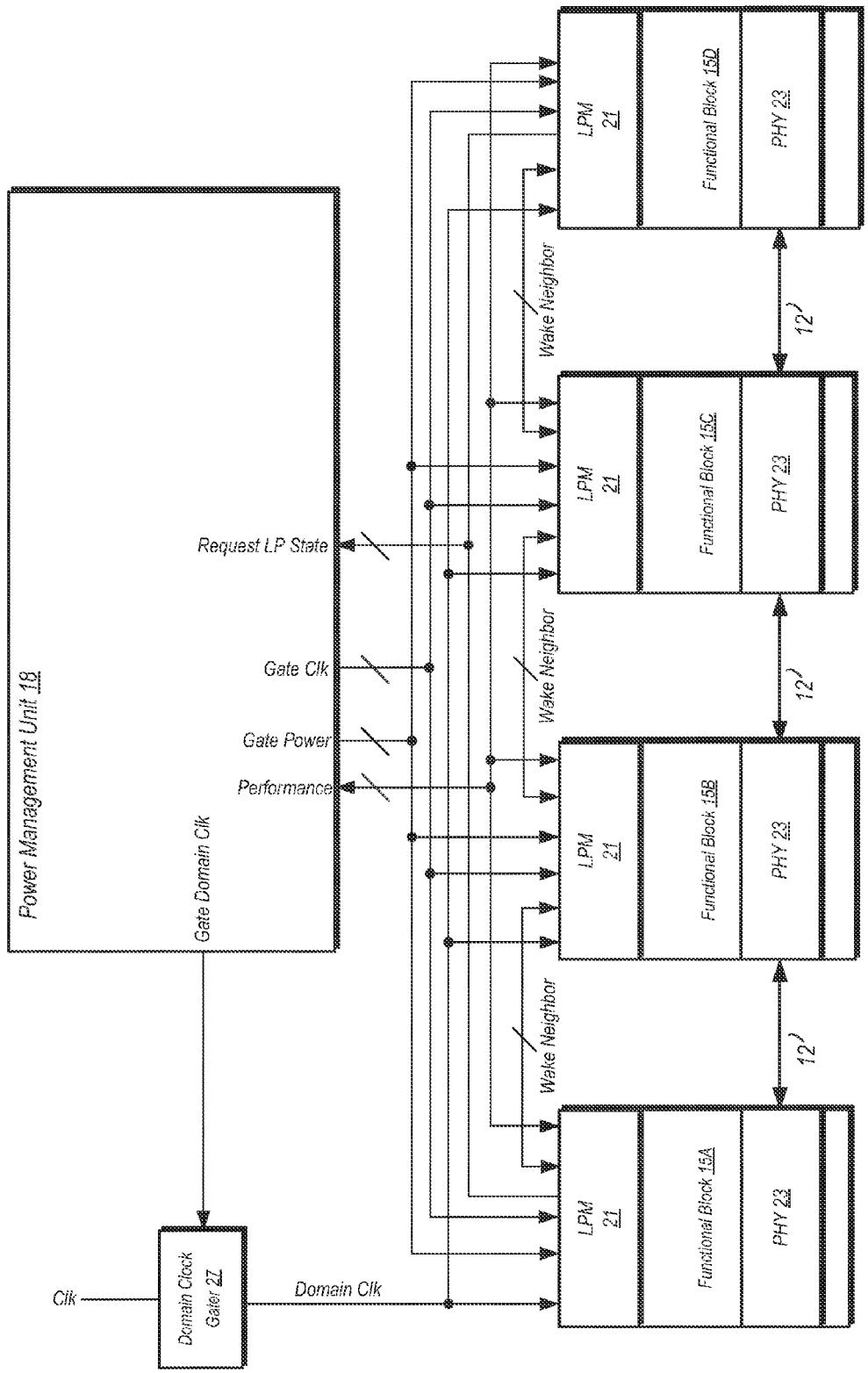
FIG. 2 is a block diagram illustrating a portion of one embodiment of an IC.

FIG. 2 is a block illustrating a portion of one embodiment of an IC. More particularly, FIG. 2 further illustrates the relationship between various functional blocks 15 and the power management unit 18. FIG. 2 also illustrates the relationship between logically adjacent pairs of functional blocks 15 with respect to power management.

In this particular example, four functional blocks, functional blocks 15A-15D are shown as being coupled to power management unit 18. Each of the functional blocks 15A-5D shown in FIG. 2 includes a local power manager 21 and a physical interface 23. Each communications link 12 in the embodiment shown is coupled between the respective physical interfaces 23 of its correspondingly coupled functional blocks.

Each local power manager 21 in the embodiment shown may perform a number of different activities directed toward optimizing the performance of its corresponding functional block 15, as well as contributing the to the optimization of the performance of IC 10 overall. Optimizing the performance of a corresponding functional block 15 may include selecting one or more tunable parameters. Examples of tunable parameters that may be selected and set by a local power manager 21 may include (but are not limited to) timeout periods for requesting entry into low power states, operating voltages, operating clock frequencies, and so on. Each local power manager 21 may also monitor activity within its respective one of functional blocks 15A-15D. When its respective functional block becomes idle for a predetermined amount of time, the local power manager 21 may assert a signal requesting to be placed in a low power state. The signal may be conveyed to power management unit 18, which may then determine if the corresponding functional block 15 can be clock gated and/or power-gated.

In the embodiment shown, each local power manager 21 is coupled to exchange various signals with power management unit 18. Each local power manager 21 may exchange performance information with power management unit 18 via a performance bus (coupled to the 'Performance' input/output of power management unit 18). More particularly, each local power manager 21 may provide local performance information to power management unit 18, which may in turn provide global performance information to each local power manager 21. The global performance information may be an aggregate of the various instances of local performance information, and may be indicative of a more comprehensive operating state of IC 10. Each local power manager 21 may periodically provide local performance information for its respective functional block 15 to power management unit 18. Responsive to receiving the local performance information, power management unit 18 may periodically provide global performance information to the local power managers 21 of the various functional blocks 15. Based on the received global performance information, each of the local power managers 21 may select and set various tunable (i.e. adjustable) parameters for their respective functional blocks 15, such as those discussed above. In some embodiments, power management unit 18 may choose which information to use in determining the global performance information to provide to the local power managers 21. For example, power management unit 18 may include a number of registers for storing the information received from the local power managers 21. Selected bits, or entire registers in some cases, may be masked such that power management unit determines the global performance information based only on unmasked information. This may be useful for further fine-tuning the global performance information during operation, but may also be useful post-silicon tuning of an IC design.

In some embodiments, the performance information exchanged between the local power managers 21 and power management unit 18 may be used for workload allocation. For example, if two of the functional blocks 15A-15D are identical processor cores, and one of these cores is idle or near idle while the other is performing a heavy workload, power management unit 18 may re-allocate some of the workload so that is more evenly balanced between the two processor cores.

Each local power manager 21 in the embodiment shown may also request to be placed into a low power state upon determining that its respective functional unit 15 is idle, by asserting a signal to the 'Request LP State' input of power management unit 18. Prior to asserting a request to enter a low power state, a given one of the functional blocks 15 may perform a handshaking routine with its logically adjacent neighbor(s). This may ensure that functional block 15 requesting to be placed in a low power state is not the target of a transaction from a logically adjacent functional block 15. For example, if functional block 15A is idle and intends to initiate a request to be placed in a low power state, it may first perform a handshake routine with functional block 15B to ensure that the latter does not have any pending transactions that would require the former to be available. After receiving acknowledgement from functional block 15B that there are no pending communications therefrom, functional block 15A may assert the request to be placed in a low power state.

In some instances, a functional block 15 may be either a target of a transaction initiated by another functional block that is logically non-adjacent, or may be a conduit through which such a transaction may pass. For example, functional block 15D may initiate a transaction with functional block 15A, with functional blocks 15B and 15C acting as conduits. Since functional blocks 15A and 15D are not logically adjacent to one another, functional block 15A may be unaware of the pending transaction. Accordingly, additional functionality to track pending transactions may be implemented. Although not explicitly shown in FIG. 2, power management 18 may nevertheless implement functionality to track pending transactions between the various functional blocks 15. Such functionality may be implemented with hardware within power management 18, by software that reports pending transactions thereto, or a combination of these. If a particular functional block 15 requests to be placed in a low power state but otherwise is involved in a pending transaction with another functional block 15 that is logically non-adjacent, power management unit 18 may prevent the requesting functional block from entering the low power state at least until after the pending transaction has completed. In some cases, if follow-up transactions are required, power management unit 18 may continue to prevent the requesting functional block 15 from entering the low power state.

If a functional block 15 has asserted a request to be placed in a low power state and is not involved in any pending transactions, power management unit 18 may thus allow the low power state to be entered. In the embodiment shown, power management unit 18 may respond to a request by a functional block 15 to enter a low power state by asserting a clock gating signal ('Gate Clk'). It is noted that each of the functional blocks 15A-15D may receive a corresponding clock gating signal from power management unit 18 independently of the other functional blocks shown in FIG. 2. Thus, each of the illustrated functional blocks may be clock gated independently of one another.

The local power manager 21 of the requesting functional block 15 may detect the assertion of the clock gating signal and may respond by gating the domain clock provided thereto via domain clock gater 27. When local power manager 21 locally performs clock gating, circuitry internal to its corresponding functional block 15 is inhibited from receiving the clock signal, and thus dynamic power savings may be achieved.

In the embodiment shown, functional blocks 15A-15D may be awakened from a low power state either by power management unit 18 or by a logically adjacent functional block 15. If a given functional block 15 is clock gated (but not power gated), power management unit 18 may cause that functional block to re-enter the active state by de-asserting the clock gating signal provided to its corresponding local power manager 21. If a given functional block 15 is power-gated (which typically includes being clock gated), power management unit 18 may cause its re-entry into the active state by de-asserting its respective power-gating signal.

In the embodiment shown, functional blocks 15A-15D are each capable of waking a logically adjacent neighbor by asserting a corresponding wake up signal ('Wake Neighbor'). Consider an example wherein functional block 15A intends to initiate a transaction with functional block 15B and the latter is in a low power state. In such a situation, functional block 15A may assert wake up signal to be received by functional block 15B. Responsive to receiving the wake up signal, functional block 15B may exit the low power state. In general, functional blocks 15 in the embodiments shown in FIGS. 1 and 2 may have the capability of waking up logically adjacent functional blocks independent of power management unit 18 (although power management unit 18 may be informed of the wake up. It is noted however that, subsequent to waking a logically adjacent neighbor by a functional block 15, additional actions may be performed before communications occur across the correspondingly coupled communications link 12. Such actions are discussed below in relation to FIGS. 3 and 4.

As noted above, a functional block 15 in the embodiment shown may initiate a transaction with another functional block 15 that is not logically adjacent thereto. In some instances, multiple functional blocks 15 between the initiating functional block and the target functional block may be in a low power state. Consider an example where functional block 15A is to initiate a transaction with functional block 15D and wherein functional blocks 15B, 15C, and 15D are all in a low power state. Functional block 15A may directly wake up functional block 15B by asserting a corresponding wake up signal. Power management unit 18, using the functionality to track pending transactions discussed above, may detect that functional block 15A intends to initiate a transaction with functional block 15D. Responsive to detecting that functional block 15A is to initiate a transaction with functional block 15D, power management unit 18 may wake up functional blocks 15C and 15D concurrent with functional block 15A waking functional block 15B. The ability to conduct such parallel, concurrent wake ups of multiple functional blocks 15 by power management unit 18 may reduce the latency to complete a transaction that includes functional blocks that are not logically adjacent to the functional block initiating the transaction.

In the embodiment shown, a domain clock gater 27 is coupled to power management unit 18. Using domain clock gater 27, another level of clock gating may be implemented. Domain clock gater 27 is coupled to receive a clock signal ('Clk') from a clock source (not shown) on IC 10 or external thereto. When domain clock gater 27 is transparent, the clock signal may pass through as the domain clock signal to each of functional blocks 15A-15D. In the event that each of functional blocks 15A-15D are in a low power state, power management unit 18 may assert a gating signal ('Gate Domain Clk') to domain clock gater 27. Responsive to receiving the gating signal from power management unit 18, domain clock gater 27 may inhibit the domain clock signal from being provided to functional blocks 15A-15D. This may realize additional savings of dynamic power. Generally speaking, at least some functional units within IC 10 may be arranged in domains coupled to receive a common clock signal via a domain clock gater 27 in a manner similar to that shown in FIG. 2. When each of the functional blocks 15 in a particular clock domain are in a low power state, power management unit 18 may clock gate the entire clock domain, via the corresponding clock gater 27, in order to provide additional power savings.

Figure 3:
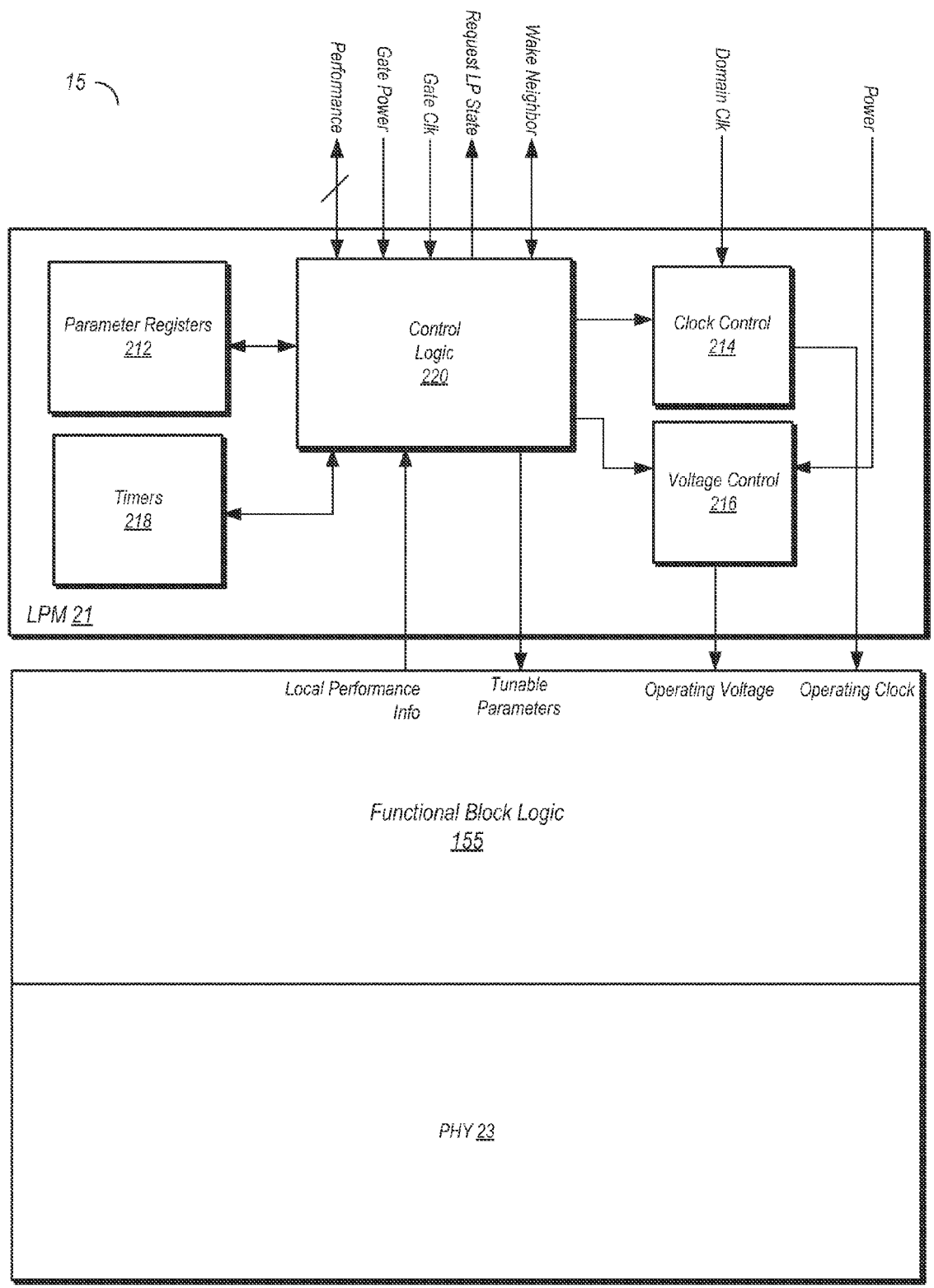
FIG. 3 is a block diagram illustrating one embodiment of a functional block of an IC including a local power management circuit.

Turning now to FIG. 3, a block diagram of one embodiment of a functional block 15 is shown. More particularly, FIG. 3 provides additional illustration of one embodiment of a local power manager 21.

In the embodiment shown, functional block 15 includes local power manager 21, functional block logic 155, and physical interface 23. Functional block logic 155 may perform the primary logical functions of functional block 155. For example, functional block 15 may be a processor core, and thus functional block logic 155 may include various types of logic circuitry used to implement a processor core, including (but not limited to) execution units, register files, branch prediction units, and so on. In another example, functional block 15 may be a graphic processor, and thus functional block logic 155 may include various types of graphics processing circuitry. In general, functional block logic 155 may include any type of logic used to implement functional block 15. Furthermore, while described here as being "logic" circuitry, it is noted that functional block logic is not limited to digital logic circuitry, and thus various embodiments may implement analog and/or mixed signal circuitry.

Physical interface 23, as described above, includes circuitry configured to interface functional block 15 with other circuitry external thereto. For example, physical interface 23 may include circuitry configured to interface functional block 15 to one or more additional instances of a functional block 15, wherein such instances may or may not perform different functions.

Local power manager 21 in the embodiment shown includes control logic 220, a group of parameter registers 212 (shown here as a single block that may include any suitable number of registers), timers 218, a clock control unit 214, and a voltage control unit 216. Control logic 220 may exchange signals with each of these units, and may also receive performance information form functional block logic 155. The performance information received from functional block logic 155 may be processed by control logic 220 and conveyed (via the signal path labeled 'Performance') to power management unit 18. Similarly, through the same signal path, control logic 220 may receive global performance (or state) information through the 'Performance' signal path from power management unit 18.

Parameter registers in the embodiment shown may store parameter information for various tunable parameters that may be selected and/or set by control logic 220. In this particular embodiment, the selectable parameters include an operating voltage, and operating frequency, and timeout periods for determining when to request entry into a clock gated state and when to request entry into a low power state. It is noted however that other parameters may also be selectable and set by control logic 220, and are thus not limited to those explicitly discussed herein. In some cases, the tunable parameters may be particular to the functional block logic 155 of that functional block. For example, function specific tunable parameters may include cache replacement policies and packet bursting parameters, among others.

Based on the received global performance information, control logic 220 may access parameter registers 212. More particularly, control logic 220 may read various operating parameters from parameter registers 212. The information read from parameter registers 212 by control logic 220 may be based on the performance information received from power management unit 18.

Clock control unit 214 in the embodiment shown is configured to adjust the frequency of the operating clock signal provided to functional block logic 155, and is further configured to gate the operating clock signal. In one embodiment, clock control unit 214 may set the frequency by selectively gating and ungating the operating clock to change its duty cycle and thus its effective frequency. In other embodiment, clock control unit 214 may implement a phase locked loop, a frequency divider, or any other suitable circuitry for changing the frequency of a clock signal. Regardless of the type of circuitry used to change the frequency, clock control unit 214 in the embodiment shown also includes circuitry for gating the operating clock signal.

In the embodiment shown, control logic 220 may cause clock control unit to set a frequency of an operating clock signal provided to functional block 155, or to gate the operating clock signal. Setting the frequency of the operating clock signal may be based on information read from a corresponding one of parameter registers 212. For example, if the power management unit 18 indicates that IC 10 is in a high performance state and/or functional block 155 is performing a heavy workload, control logic 220 may cause clock control unit 214 to set the operating clock to a high frequency. Conversely, if power management unit 18 indicates that IC 10 is in a low performance state, or if functional block 155 is performing a light workload, control logic 220 may cause clock control unit 214 to reduce the operating clock frequency. The frequency of the operating clock may be set based on information read from one of parameter registers 212 by control logic 220 responsive to receiving global performance information from power management unit 18. The operating clock may be gated responsive to power management unit 18 granting a request by control logic 220 to gate the clock when it is determined that functional block logic 155 and physical interface 23 are idle.

Voltage control unit 216 in the embodiment shown may be implemented as any suitable circuitry that is capable of adjusting a received voltage. Power may be received by voltage control unit 216 from a source external to functional block 15. Control logic 220 may cause voltage control unit 216 to set the operating voltage based on information red from parameter registers 212 responsive to receiving global performance information from power management unit 18. If higher performance is desired, the operating voltage may be set to a higher level commensurate with the performance demands. If a lower performance is acceptable, or power savings is a priority, the operating voltage may be set to a lower level. The operating voltage may be adjusted periodically by voltage control unit 216 responsive to control logic 220 receiving updated global performance information from power management unit 218. Voltage control unit 216 may also remove power from functional block logic 155 and physical interface 23 responsive to power management unit 18 granting a power gating request from power management unit 18.

Clock gating and power gating may be requested by control logic 220 based on determining whether functional block logic 155 and physical interface 23 have been idle for various amounts of time. In the embodiment shown, timers 218 include at least two different timers. A first of these timers is implemented for determining if a selected timeout threshold for clock gating has elapsed. A second of these timers is implemented for determining if a selected timeout threshold for power gating has elapsed. The timeout thresholds may be selected based on the global performance information received from power management unit 18, and read from parameter registers 212. In the embodiment shown, higher timeout thresholds may be selected for higher global performance levels, as the likelihood that functional block 15 will be needed is greater. Since clock gating and power gating may incur various performance costs (e.g., saving a state of the functional block logic 155), the likelihood that functional block 15 will be needed makes incurring these costs less desirable. Lower timeout thresholds may be selected for lower global performance levels, since it may be more tolerable to incur the performance costs in low performance operational states, and power savings may be prioritized. Regardless, the particular timeout threshold for the timers discussed herein may be set based on a value read from parameter registers 212 by control logic 220 responsive to receiving global performance information from power manager 18.

A first timeout value selected by control logic 220 may correspond to an amount of idle time prior to requesting that functional block logic and physical interface 23 be placed in a clock gated state. Control logic 220 may determine when functional block logic 155 and physical interface 23 are idle (i.e. not performing useful work). A first one of timers 218 may have a threshold that is set by control logic 220 based on a value read from parameter registers 212. If the threshold time elapses as indicated by the first one of timers 218, control logic 220 may assert a request to power management unit 18 to be placed in a clock gated state. Additionally, control logic 220 may cause the initiation of handshake routines with each logically adjacent neighbor to functional block 15. Once it is determined that functional block 15 is not the target of any pending/in-flight transactions, power management unit 18 may grant the clock gating request, and clock control unit 214 may gate the operating clock. In accordance with the discussion above, the first timeout value may generally be higher for higher global performance states, and lower for lower global performance states.

A second timeout value selected by control logic 220 may correspond to an amount of time that functional block logic 155 and physical interface 23 may be clock gated prior to being placed in a power gated state. If a threshold set in a second one of timers 218 (based on a value read by control logic 220 from parameter registers 212) elapses, control logic 220 may assert a request to power management unit 18 to be placed in a power gated state. Responsive to power management unit 18 granting the request, control logic 220 may cause voltage control unit 216 to remove power from functional block logic 155 and physical interface 23. In accordance with the discussion above, the second timeout value may generally be higher for higher global performance states, and lower for lower global performance states.

It is noted that local power management unit 21 may continue receiving clock and power even when functional block logic 155 and physical interface 23 are otherwise clock and/or power gated. However, in some embodiments of IC 10, local power management unit 21 may be clock and/or power gated from a domain level. For example, as discussed above, local power manager 21 may be clock gated when the domain clock is gated at domain clock gater 27.

Figure 4:
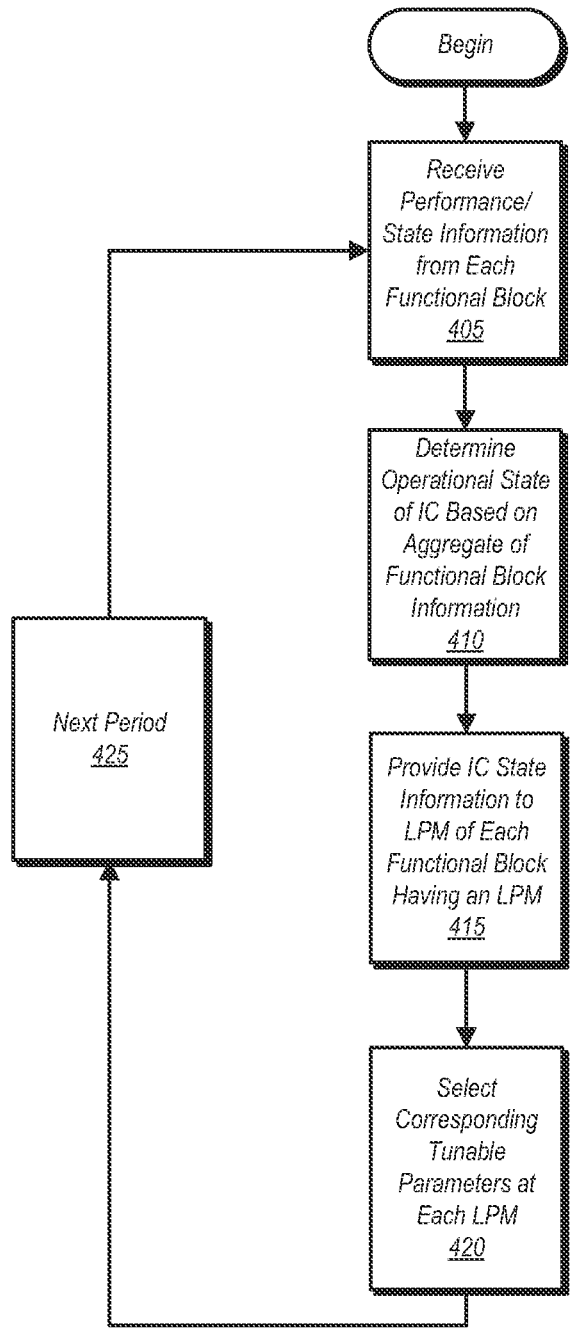
FIG. 4 is a flow diagram illustrating one embodiment of a method for selecting tunable parameters during the operation of an IC.

FIG. 4 is flow diagram illustrating one embodiment of a method for selecting tunable parameters during the operation of an IC. Method 400 in the embodiment shown may be performed by various embodiments of the hardware discussed above, as well as embodiments not explicitly discussed herein. Furthermore, embodiments of method 400 performed using software, firmware, or any hardware/software/firmware combination are possible and contemplated.

Method 400 begins with a power management unit receiving performance/state information from each of a number of different functional blocks that are configured to provide such information (block 405). It is noted that in some instances, a functional block that is in a low power state (e.g., clock and power gated) may not provide such information during a given cycle, although its status may otherwise be known by the power management unit. It is further noted that in some embodiments, the power management unit may receive performance/state information from software executing on the IC. After receiving performance/state information from the functional blocks, the power management unit may determine an operational state of the IC based on an aggregated of the received information (block 410). The operational state (or global performance information) of the IC may then be provided to local power managers for each functional block that includes one (block 415). Each local power manager for each functional block that is so configured may then select tunable parameters that correspond to the operational state/global performance information received from the local power manager (block 420). Thereafter, the method may advance to a next period (block 425), and method 400 may be repeated on a periodic basis.

Figure 5:
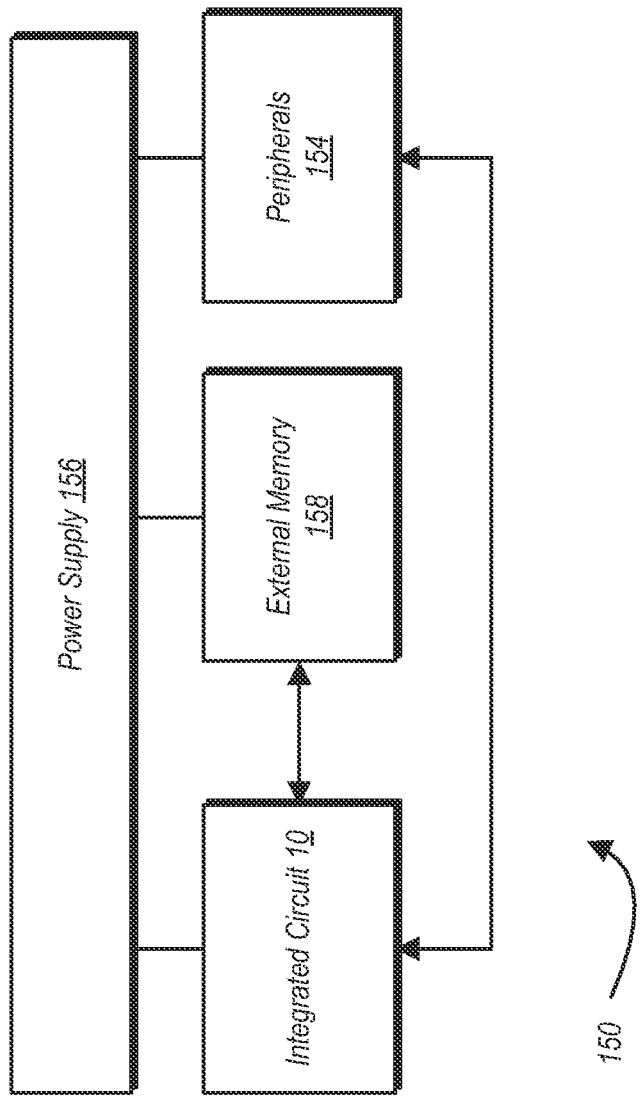
FIG. 5 is a block diagram of one embodiment of an exemplary system.

Turning next to FIG. 5, a block diagram of one embodiment of a system 150 is shown. In the illustrated embodiment, the system 150 includes at least one instance of the integrated circuit 10 coupled to external memory 158. The integrated circuit 10 is coupled to one or more peripherals 154 and the external memory 158. A power supply 156 is also provided which supplies the supply voltages to the integrated circuit 10 as well as one or more supply voltages to the memory 158 and/or the peripherals 154. In some embodiments, more than one instance of the integrated circuit 10 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as WiFi, Bluetooth, cellular, global positioning system, etc. The peripherals 154 may also include additional storage, including RAM storage, solid-state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

Numerous variations and modifications will become apparent to those skilled in the art once the above disclosure is fully appreciated. It is intended that the following claims be interpreted to embrace all such variations and modifications.

What is claimed is:

1. An integrated circuit comprising:
a plurality of functional blocks each having a local block manager circuit; and
a management unit coupled to each of the plurality of functional blocks, wherein the management unit is configured to determine an operational state of the integrated circuit based on determining respective operating states of each of the plurality of functional blocks;
wherein the local block manager circuit for each of the plurality of functional blocks is configured to select one or more tunable parameters based on the operational state determined by the management unit.

2. The integrated circuit as recited in claim 1, wherein the local block manager for each of the plurality of functional blocks includes a plurality of registers each storing parameter information, and wherein the local block manager for each of the plurality of functional blocks is configured to select the one or more tunable parameters by reading one or more of the plurality of registers.

3. The integrated circuit as recited in claim 1, wherein the one or more tunable parameters includes an idle time, wherein each of the local block manager circuit for each of the plurality of functional blocks is configured to select an idle time at which its corresponding one of the plurality of functional blocks asserts a request to be placed into a low power state by the power management unit.

4. The integrated circuit as recited in claim 3, wherein a local power management circuit of a given one of the plurality of functional blocks is configured to select a first idle time responsive to receiving an indication from the power management unit that the IC is operating in a high performance mode, and further configured to select a second idle time responsive to receiving an indication from the power management unit that the IC is operating in power savings mode.

5. The integrated circuit as recited in claim 3, wherein the local block manager circuit for each of the plurality of functional blocks includes a timer configured to provide an indication at a selected idle time, wherein the idle time is selected based on the operational state determined by the power management unit.

6. A method comprising:
determining an operational state of an integrated circuit (IC), wherein said determining comprises a management unit monitoring determining respective operational states of each of a plurality of functional blocks;
providing information indicative of the operational state of the IC to a local block manager in each of the plurality of functional blocks; and
selecting, in the local block manager of at least one of the plurality of functional blocks, one or more tunable parameters based on the information indicative of the operational state of the IC.

7. The method as recited in claim 6, further comprising the local block manager of the at least one of the plurality of functional blocks accessing one or more of a plurality of registers to select the one or more tunable parameters.

8. The method as recited in claim 6, wherein selecting one or more tunable parameters includes selecting an idle time threshold for the at least one of the plurality of functional blocks, wherein the idle time threshold determines an amount of time that the one of the plurality functional blocks is to remain in the idle state before requesting to be placed in a low power state.

9. The method as recited in claim 8, further comprising the local block manager selecting a first idle time responsive to receiving an indication that the IC is operating in a high performance state, and selecting a second idle time responsive to receiving an indication that the IC is operating in a low performance state, wherein a duration of the first idle time is greater than a duration of the second idle time.

10. The method as recited in claim 6, wherein the tunable parameters include one or more of the following:
an operational clock frequency; and
an operating voltage.

11. An integrated circuit comprising:
a plurality of functional units each having a local power manager circuit; and
a global power manager circuit coupled to each of the plurality of functional units, wherein the global power manager circuit is configured to provide an indication of an operational state of the integrated circuit to each of the plurality of functional units, wherein the global power manager circuit is configured to determine the operational state of the integrated circuit based on receiving indications of individual operating states of each of the plurality of functional units;
wherein each local power management circuit of a respective one of the plurality of functional units is configured to select one or more tunable parameters based on the indication of the operational state provided by the global power manager circuit.

12. The integrated circuit as recited in claim 11, wherein each local power management circuit is configured to select an operating voltage and an operating clock frequency based on the indication of the operational state provided by the global power manager circuit.

13. The integrated circuit as recited in claim 11, wherein each local power management circuit is configured to select at least one timeout period for determining when to request entry into a sleep state based on the indication of the operational state provided by the global power manager circuit.

14. The integrated circuit as recited in claim 13, wherein each local power management unit is configured to select, based on the indication of the operational state provided by the global power management circuit, a first timeout period for requesting entry into a clock gated state, and a second timeout period for requesting entry into a power gated state.

15. A method comprising:
periodically determining local operating states of each of a plurality of functional units of an integrated circuit (IC);
determining a global operating state of the IC based on the local operating states of each of the plurality of functional units;
providing information indicating the global operating state of the IC to respective local power managers of each of the plurality of functional units; and
selecting, in the respective local power manager of one or more of the functional units, at least one timeout period indicating a duration that each of the one or more functional units is to remain idle before requesting to be placed into at least one of first and second sleep states.

16. The method as recited in claim 15, further comprising selecting, in the respective local power manager of a given one of the plurality functional units:
a first timeout period indicating a duration that the given one of the plurality of functional units is to remain idle prior to requesting to be placed in a first sleep state, wherein the first sleep state comprises clock gating the given one of the plurality of functional units; and
a second timeout period indicating a duration that the given one of the plurality of functional units is to remain in the first sleep state prior to requesting to be placed in a second sleep state, wherein the second sleep state comprises power gating the given one of the plurality of functional units.

17. The method as recited in claim 16, further comprising:
selecting a first value for the first timeout period responsive to information indicating that the global operating state is a high performance state; and
selecting a second value for the first timeout period responsive to information indicating that the global operating state is a low performance state;
wherein a duration of the first timeout period is greater than a duration of the second timeout period.

18. The method as recited in claim 17, further comprising:
selecting a third value for the second timeout period responsive to information indicating that the global operating state is a high performance state; and
selecting a fourth value for the second timeout period responsive to information indicating that the global operating state is a low performance state;
wherein a duration of the third timeout period is greater than a duration of the fourth timeout period.

19. The method as recited in claim 15, wherein said selecting at least one timeout period comprises the respective local power manager of one or more of the functional units reading at least one timeout value from a corresponding one of a plurality of registers.

20. An integrated circuit comprising:
a plurality of functional units each having a respective local power management circuit; and
a global power management circuit configured to periodically determine respective local operating states of each of a plurality of functional units, determine a global operating state based on the respective local operating states, and provide information indicative of the global operating state to the respective local power management circuits of each of the plurality of functional units;
wherein the respective local power management circuits of each of the plurality of functional units is configured to select at least one timeout period indicating a duration that its corresponding one of the plurality of functional units is to remain idle before requesting to be placed into at least one of first and second sleep states.

21. The integrated circuit as recited in claim 20, wherein the respective local power management circuits of each of the plurality of functional units are configured to:
select a first timeout period indicating a duration that its corresponding one of the plurality of functional units is to remain idle prior to requesting to be placed in a first sleep state, wherein the first sleep state comprises clock gating the given one of the plurality of functional units; and
a second timeout period indicating a duration that its corresponding one of the plurality of functional units is to remain in the first sleep state prior to requesting to be placed in a second sleep state, wherein the second sleep state comprises power gating the given one of the plurality of functional units.

22. The integrated circuit as recited in claim 20, wherein the respective local power management circuits of each of the plurality of functional units are further configured to:
select a first value for the first timeout period responsive to information indicating that the global operating state is a high performance state; and
select a second value for the first timeout period responsive to information indicating that the global operating state is a low performance state;
wherein a duration of the first timeout period is greater than a duration of the second timeout period.

23. The integrated circuit as recited in claim 22, wherein the respective local power management circuits of each of the plurality of functional units is configured to:
select a third value for the second timeout period responsive to information indicating that the global operating state is a high performance state; and
select a fourth value for the second timeout period responsive to information indicating that the global operating state is a low performance state;
wherein a duration of the third timeout period is greater than a duration of the fourth timeout period.

24. The integrated circuit as recited in claim 20, wherein the respective local power management circuits for each of the plurality of functional units are configured to select at least one timeout period comprises the respective local power manager of one or more of the functional units reading at least one timeout value from a corresponding one of a plurality of registers.

* * * * *